March 10, 1964  H. BAY  3,124,050
MULTIPLE EXPOSURE DEVICE FOR CAMERAS
Filed Aug. 21, 1962  2 Sheets-Sheet 1
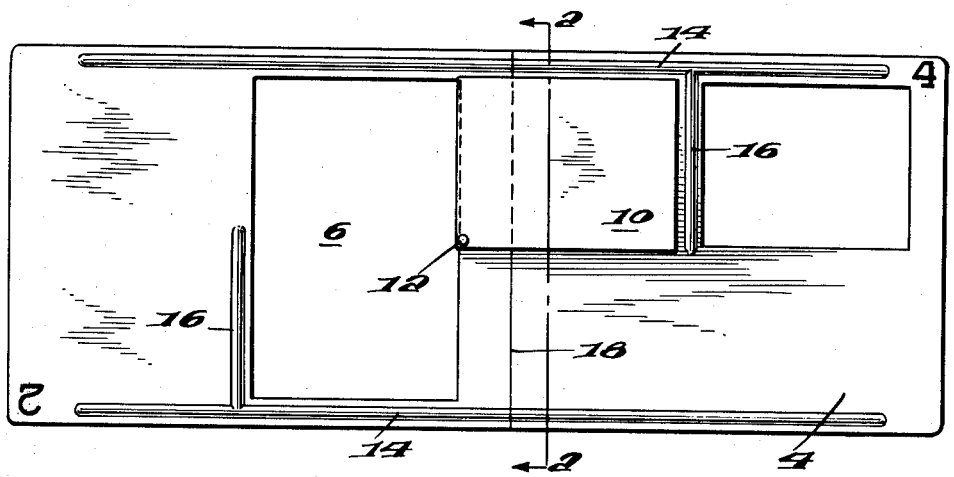
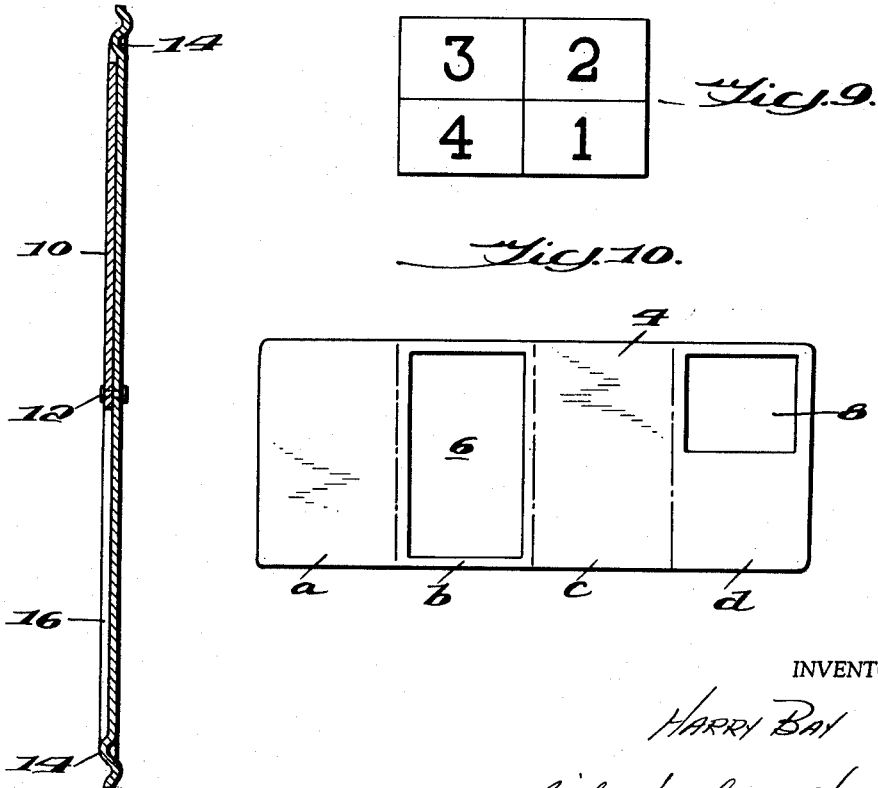
INVENTOR
Harry Bay
BY Bailey, Stephens & Huettig
ATTORNEYS

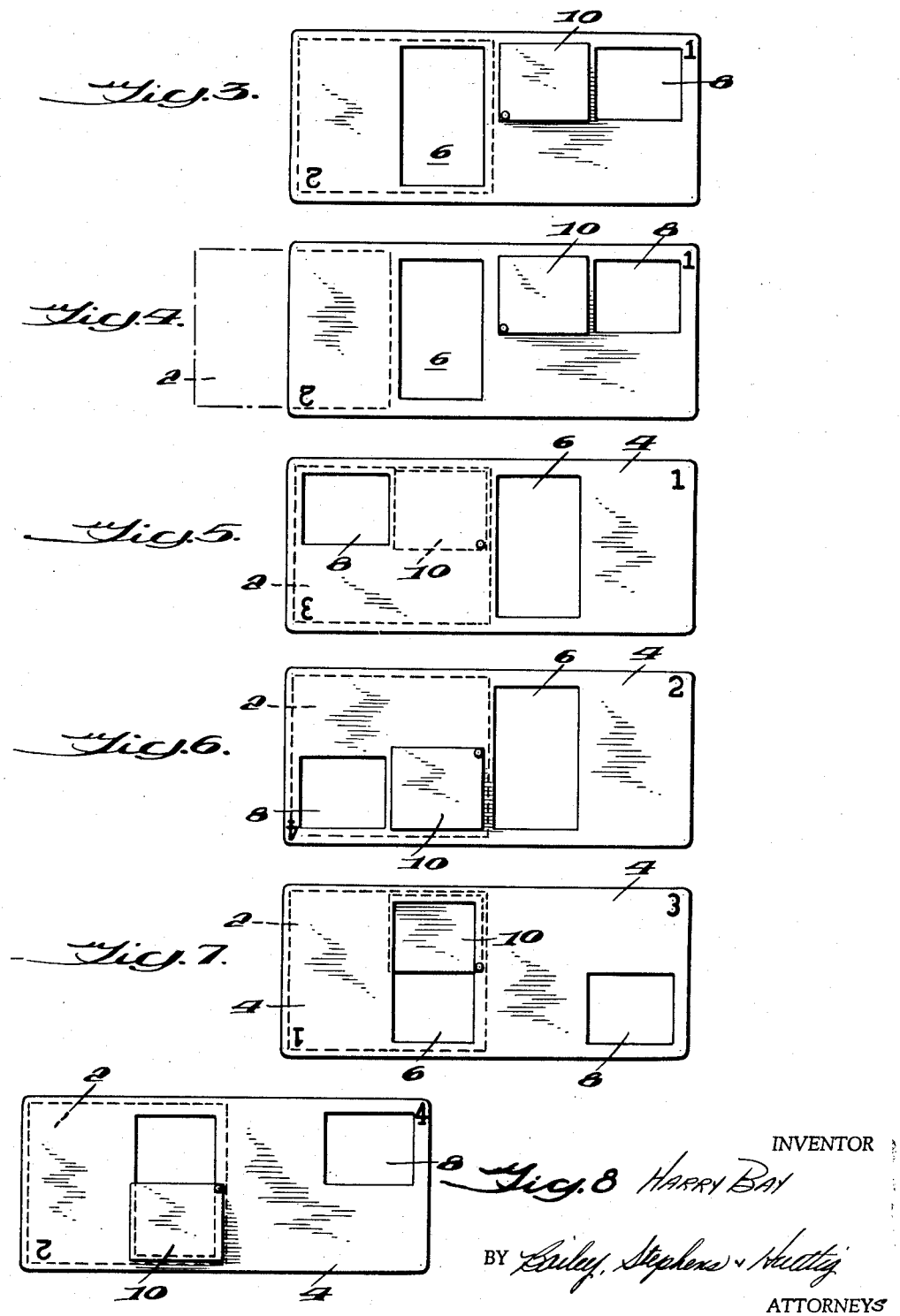

United States Patent Office 3,124,050
Patented Mar. 10, 1964

3,124,050
MULTIPLE EXPOSURE DEVICE FOR CAMERAS
Harry Bay, 2215 Westfield Ave., Reno, Nev.
Filed Aug. 21, 1962, Ser. No. 218,384
5 Claims. (Cl. 95—36)

The invention relates to a mask forming a multiple exposure device for cameras, and more particularly to a device by which either one-fourth or one-half of a section of film can be exposed, so that several pictures can be taken instead of one.

More particularly, the object of the invention is to provide a simple and inexpensive arrangement capable of being used with a camera to expose any quarter or either half of a section of film which is normally completely exposed when the camera is operated. It is, in the form shown, especially intended for use in connection with a film holder for use with self-developing film.

In general, the invention contemplates a plate having two openings therein, one of which has the size of about half of the normal film area while the other opening has the size of about one-fourth of such area. A pivoted plate, mounted to swing about an axis transverse to the plane of the plate is pivoted near the center of one of the longer sides of the larger opening so as to be swingable to cover half the opening. The openings are so located that, by manipulating the plate in a manner to be described, either half or any quarter of the film area can be exposed individually.

Further objects and advantages will appear more fully from the following description, especially when taken in conjunction with the accompanying drawings which form a part thereof.

In the drawings:
FIG. 1 shows in side elevation a device embodying the invention;
FIG. 2 is a cross-section on the line 2—2 of FIG. 1;
FIGS. 3 and 4 show the device in position for exposing two halves of a picture area;
FIGS. 5 to 8 show the device in position for exposing the four quarters of a picture area;
FIG. 9 shows the decalcomania for the view finder; and
FIG. 10 is an explanatory diagram.

The arrangement is intended to expose either the vertical half or any quarter of a picture or film area indicated in broken lines at 2. It is especially adaptable to being inserted in a film cartridge between the film and the shutter. It basically includes a mask formed of a plate 4 of metal or the like having a length at least twice that of one dimension of the film area and a width at least as great as the other dimension. This plate has a larger opening 6 therein of a size equal to approximately half the film area, in an area b (FIG. 10), spaced from the shorter end edge of the plate by a distance substantially equal to its width, so as to leave an area a with a size of approximately half the picture area.

In the area d adjacent the other shorter end edge of the plate, and on one side of the horizontal center of such area, is a smaller opening 8 with an area of about one-fourth the picture area. Area c is plain.

A cover or shield 10 is pivoted at a point 12, located near the center of the longer edge of opening 8, preferably on the side nearest area c, to turn about an axis transverse to the plane of plate 4. This shield has an area of about one-fourth the picture area, and can cover one-half or the other of opening 6.

Plate 4 has along its upper and lower edges grooves and ribs 14. It also has two transverse shorter ribs 16 on the face on which shield 10 is located, these being engageable by shield 10 when it is in the positions of FIGS. 3 to 6 and 7 to 8 respectively for frictionally holding the shield in position.

This device is used primarily with a holder for film adapted to fit on the back of a camera with, say, a 4″ x 5″ back. If the user wants to take two pictures on a single film area, he first inserts a film packet in the film holder and then withdraws it only partially. The mask is now inserted from the left into the film holder alongside the film on the side towards the shutter or lens, in the position shown in FIG. 3. The envelope is then withdrawn further, as in normal operation. The opening 6 now overlies the right-hand side of the picture area of the film (FIG. 3), which will thus be exposed when the shutter is opened.

The envelope is now drawn half way out, the mask is placed in position and reinserted until its center line 18 (which appears on both sides) reaches the shoulder of the film holder, which corresponds to the position of FIG. 4, where the left-hand half of the picture area is exposed, when the shutter is operated.

The fully exposed film is now withdrawn and developed.

In order to divide the picture area into four parts, the mask is first inserted in the position shown in FIG. 5 to expose the upper left or first quadrant through opening 8. It is then turned upside down and inserted, as in FIG. 6, to expose the lower left or second quadrant. Then, with shield 10 swung to cover half of opening 8, it is inserted as shown in FIG. 7 to expose the lower right or third quadrant, then reversed and inserted as in FIG. 8 to expose the upper right or fourth quadrant.

Of course, one-half of the film area could be exposed through opening 8 to make a picture half the normal size and the other half could be divided into two-quarters if desired.

The mask has the numbers 1 to 4 in the upper right corners to designate the positions for the various quadrants. It is likewise desirable to apply a transparent decalcomania such as is shown in FIG. 9 to the view finder, so that the operator of the camera knowns which part of the view finder shows the picture which will appear on the exposed quadrant or quadrants.

An example of the type of mechanism with which the mask can be used is described in a booklet entitled "How to use your Polaroid 4 x 5 Film Holder Model 500."

It will be seen that the mask includes a plate of substantially twice the length and the same width as the exposure area, which can be considered as divided into four transverse areas a to d (FIG. 10); of which areas two are solid or opaque, one (a) adjacent one shorter edge and the other (c) in the other half of the plate and remote from a shorter edge. One of the other areas (b) has an opening half the size of the exposure area, with means carried by the plate (shield 10) movable to cover half the opening, while the other area (d) has an opening of a size equal to one-fourth of the picture area and located on one side of the longitudinal center line of the masking plate.

The ribs 14 give clearance to the film during insertion of the mask and make the operation smooth and trouble-free.

While I have described herein one embodiment of my invention, I wish it to be understood that I do not intend to limit myself thereby except within the scope of the claims hereto or hereinafter appended.

I claim:
1. A multiple-picture masking device comprising a plate of substantially twice the length of the exposure area of the camera with which the device is to be used, a first transverse quarter area of the plate adjacent one shorter end of the plate and a second transverse quarter area in the other half of the plate remote from the shorter end of the plate both being opaque, a third quarter area having a first opening therein of substantially half the size of the exposure area, means carried by the plate and movable for selectively covering and uncovering half of said opening, and the fourth quarter area having a second opening therein of substantially one-fourth the size of the exposure area located on one side of the longitudinal center line of the plate.

2. In a device as claimed in claim 1, said covering means comprising a shield mounted to turn about an axis transverse to the plane of the plate, and means carried by the plate for releasably holding the shield in covering and uncovering positions.

3. In a device as claimed in claim 2, said axis being located adjacent the midpoint of one of the longer edges of said first opening.

4. In a device as claimed in claim 1, said plate having ribs extending longitudinally thereof adjacent the longer edges.

5. In a device as claimed in claim 1, said plate having indicia thereon to indicate the quadrant of the picture area being exposed.

No references cited.